(12) United States Patent
Roffet

(10) Patent No.: US 8,811,741 B2
(45) Date of Patent: Aug. 19, 2014

(54) DIFFERENTIATED PROCESSING METHOD OF IMAGE ZONES

(75) Inventor: Gregory Roffet, Coublevie (FR)

(73) Assignee: STMicroelectronics (Grenoble 2) SAS, Grenoble (FR)

( * ) Notice: Subject to any disclaimer, the term of this patent is extended or adjusted under 35 U.S.C. 154(b) by 62 days.

(21) Appl. No.: 13/552,720

(22) Filed: Jul. 19, 2012

(65) Prior Publication Data

US 2013/0022269 A1 Jan. 24, 2013

(30) Foreign Application Priority Data

Jul. 20, 2011 (FR) ..................................... 11 56576
Jul. 20, 2011 (FR) ..................................... 11 56582

(51) Int. Cl.
*G06K 9/00* (2006.01)
(52) U.S. Cl.
CPC ...................................... *G06K 9/00* (2013.01)
USPC ........................................................ 382/173
(58) Field of Classification Search
CPC ............ G06K 9/32; G06K 9/38; G06K 9/40; G06K 9/44; G06K 2009/2045; G06T 3/0087; G06T 3/403; G06T 3/4007; G06T 3/4084; G06T 5/001; G06T 5/002; G06T 5/003; G06T 5/004; G06T 5/20; G06T 7/0083; G06T 7/0085; G06T 7/0091; G06T 7/401; G06T 7/403; G06T 7/602; G06T 2207/10024; G06T 2207/10026; G06T 2207/20016; G06T 2207/20012; G06T 2207/20032; G06T 2207/20036; G06T 2207/20021; G06T 2207/20192; G06T 2207/20144; H04N 1/00843; H04N 1/00848; H04N 1/00864; H04N 1/00872; H04N 1/00875; H04N 1/4092; H04N 5/21; H04N 5/208; H04N 7/26888; H04N 9/646; H04N 19/00096; H04N 19/00139; H04N 19/00157; H04N 19/002; H04N 19/0026; H04N 19/00278; H04N 19/0315; H04N 19/00387; H04N 19/0059; H04N 19/00757; H04N 19/00775; H04N 19/00781; H04N 19/0089; H04N 19/00909
See application file for complete search history.

(56) References Cited

U.S. PATENT DOCUMENTS

| 7,428,333 B2 | 9/2008 | Asari et al. |
| 7,711,199 B2 * | 5/2010 | Lee et al. ....................... 382/251 |
| 7,817,872 B2 * | 10/2010 | Michel et al. .................. 382/266 |

(Continued)

OTHER PUBLICATIONS

Guillon et al., "Adaptive nonlinear filters for 2D and 3D image enhancement," Signal Processing, Elsevier Science Publishers, Amsterdam, NL, vol. 67, No. 3, Jun. 30, 1998, pp. 237-254.

(Continued)

*Primary Examiner* — Jose Couso
(74) *Attorney, Agent, or Firm* — Allen, Dyer, Doppelt, Milbrath & Gilchrist, P.A.

(57) ABSTRACT

A method for improving the perception of an image may include performing a main separation of the pixels of the image into two categories, one corresponding to pixels of a flat zone, and the other corresponding to pixels of a textured zone. The method may also include processing the pixels of each category according to a method optimized according to the type of zone. Before the main separation step, a preliminary separation of the pixels may be performed into one category of normal pixels intended for the main separation step, and one category of singular pixels, with the criterion for selecting the singular pixels being adapted to identify pixels that would be wrongly identified as pixels of a textured zone. The singular pixels may then be processed according to a method adapted to their nature.

22 Claims, 3 Drawing Sheets

(56) References Cited

U.S. PATENT DOCUMENTS

| | | | |
|---|---|---|---|
| 7,860,167 B2 * | 12/2010 | Le Dinh et al. | 375/240.2 |
| 8,145,005 B2 * | 3/2012 | Incesu et al. | 382/254 |
| 8,189,933 B2 * | 5/2012 | Holcomb et al. | 382/232 |
| 8,233,745 B2 * | 7/2012 | Matsumoto et al. | 382/299 |
| 8,320,636 B2 | 11/2012 | Weiss | |
| 8,503,734 B2 | 8/2013 | Weiss | |
| 8,548,257 B2 | 10/2013 | Reid et al. | |
| 2002/0172431 A1 | 11/2002 | Atkins et al. | |
| 2009/0141978 A1 | 6/2009 | Roffet et al. | |
| 2010/0074548 A1 | 3/2010 | Pan et al. | |
| 2013/0022269 A1 | 1/2013 | Roffet | |
| 2013/0022286 A1 | 1/2013 | Roffet | |

OTHER PUBLICATIONS

Klette, "Local Operators," Aug. 2006, pp. 1-16.

* cited by examiner

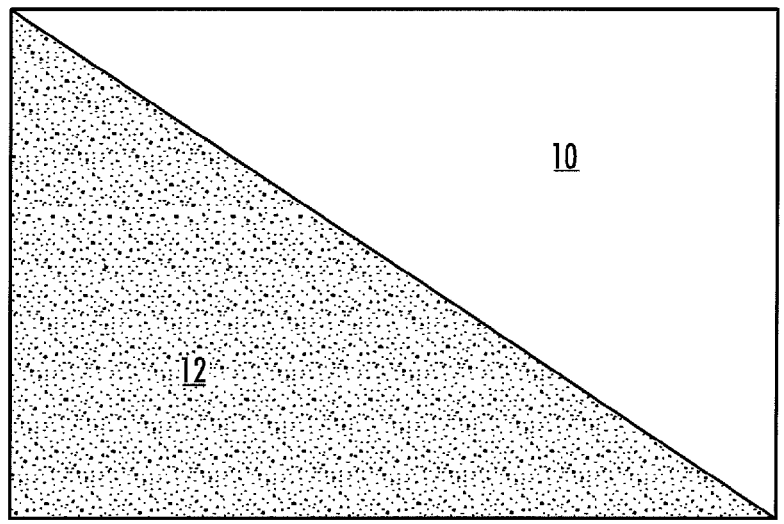
FIG. 1
(PRIOR ART)
FIG. 2
(PRIOR ART)
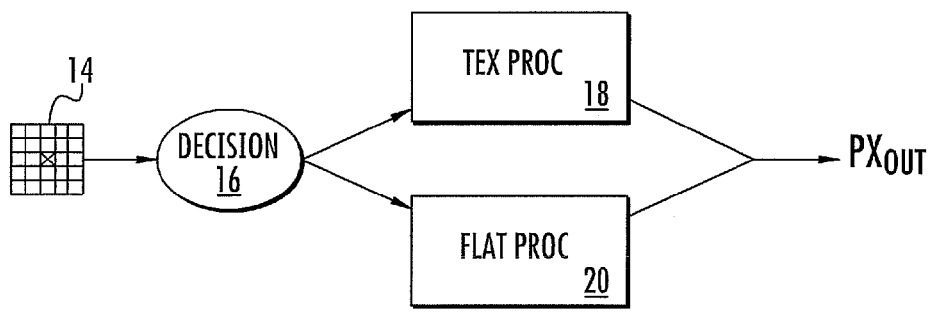
FIG. 3
(PRIOR ART)

DIFFERENTIATED PROCESSING METHOD OF IMAGE ZONES

FIELD OF THE INVENTION

The present disclosure relates to image processing for improving visual perception, and, more particularly, to image processing performed within embedded systems, such as digital cameras.

BACKGROUND OF THE INVENTION

Among common processes used to improve the visual perception of an image, noise reduction, sharpness improvement and improvement of the balance of brightness and contrast are included. The quality and the usefulness of each of these processes depend on the properties of the image in the vicinity of each pixel processed. Therefore, some zones of the image may be differentiated so as to select the most appropriate process for each zone.

FIG. 1 shows an image comprising two types of zones where it is desirable to process each zone differently: a flat zone 10, such as a zone depicting the sky, and a textured zone 12, such as a zone depicting leaves. In a flat zone, noise reduction is favored, while in a textured zone, sharpness, brightness, and contrast balancing are favored. Noise reduction techniques suited for textured zones can also be used, such as described in U.S. Patent Application Publication No. 2009/0141978 to Roffet et al.

Common image processes, i.e. at least the relatively simple ones preferably used in embedded systems, are based on a reference kernel defined around each pixel to be processed. FIG. 2 represents such a kernel. It is a 5×5-pixel square of the image, in the center of which is a pixel to be processed. This kernel size is common and offers a good complexity compromise.

FIG. 3 represents a reference kernel 14 processing stream, enabling differentiated processing according to the nature of the zone in which the pixel being processed is located. In block 16, a criterion representative of the pixel belonging to a flat zone (10 in FIG. 1) is calculated from the kernel. If the criterion is not met, the pixel is considered to belong to a textured zone (12), and the kernel 14 undergoes, in block 18, a process adapted to the textured zones. If the criterion is met, the kernel undergoes, in block 20, a process adapted to flat zones. The process in blocks 18 or 20 produces a single pixel $Px_{out}$, replacing the current pixel in the new image.

One example of selection criterion can be as follows. As represented in FIG. 2, for each pixel i in the reference kernel, the difference $d_i$ between this pixel and the central pixel, which is the pixel to be processed, is calculated. In the case of a 5×5 kernel, 24 differences $d_1$ to $d_{24}$ are obtained, with the zero difference for the central pixel not being counted. The differences are calculated in terms of luminance.

It is then considered that the pixel to be processed belongs to a flat zone if the number of differences below a luminance threshold is close to the number of pixels in the kernel (e.g. at least equal to 22 in the case of a 5×5 kernel).

Occasionally, such algorithms do not classify certain pixels correctly. For example, if the pixels in the kernel are all similar except for the central pixel, all the differences have a high value, such that the criterion above classifies the pixel as not belonging to a flat zone, whereas it is manifestly an incorrect pixel in a flat zone. The pixel is thus classified as belonging to a textured zone. The textured zone then undergoes processes such as sharpness improvement, which may result in amplifying the singularity of the wrongly classified pixel, making it even more visible.

More complex algorithms would enable this specific example to be identified and to potentially correct it. However, it should be recalled that, within the framework of embedded systems, the complexity of the algorithms may need to be limited. Furthermore, only one striking singular case is mentioned above, but there are more subtle cases in which the pixels are wrongly classified and also generate unpleasant visual artifacts.

FIG. 4 shows a more detailed example of a processing stream 18 of the pixels classified as belonging to a textured zone. A RAM memory is used as a temporary working space and stores parts of the image being processed. A non-volatile memory NVM stores the original images and receives the images after processing. A first process NR includes, for example, an adaptive noise reduction optimized for textured zones, as disclosed in U.S. Patent Application Publication No. 2009/0141978 to Roffet et al. This process works on reference kernels 14 read in the original image, for example, 5×5-pixel kernels containing the pixel to be processed in the center. The pixels to be processed have been identified by the decision step 16 in FIG. 3. The process calculates a single pixel from the kernel, with the pixel being stored in the RAM memory.

The next step SHARP is, for example, an increase in the sharpness. This process also works on a reference kernel, 14.2, which may differ in size to the kernel 14. The kernel 14.2 is read in the RAM memory when the process NR has produced the pixels defining it. The process SHARP calculates a single pixel from the kernel 14.2, with the pixel being written in the RAM memory.

The next step USM comprises, for example, an increase in the acutance, which includes an increase in the local contrast and an accentuation in the transitions between two adjacent colors. This technique is commonly designated by the acronym USM (UnSharp Mask). Like the previous processes, the USM process works on a reference kernel 14.3, read in the RAM memory when the previous process has produced all the pixels of this kernel. The USM process produces from the kernel 14.3 a single pixel defining the final processed image, which is written, for example, in the non-volatile memory NVM.

It can be seen that each process works on pixels defining an intermediate image produced by the previous process. With three processes, two intermediate images are used, the necessary zones of which are stored in the RAM memory. This RAM memory is generally a fast-access memory so as not to slow down the processing. It is generally not possible to store the intermediate images in the non-volatile memory NVM, as access to such memories is too slow.

SUMMARY OF THE INVENTION

The object is to have a processing method differentiated by zones that reduces or does not generate any visible artifacts, while being less complex.

The present disclosure discloses an approach including a method for improving the perception of an image comprising performing a main separation of the pixels of the image into two categories, one corresponding to pixels of a flat zone, and the other corresponding to pixels of a textured zone. The method may include processing the pixels of each category according to a method optimized according to the type of zone. Before the main separation step, a preliminary separation of the pixels may be performed into one category of normal pixels intended for the main separation step, and one category of singular pixels, the criterion for selecting the singular pixels being adapted to identify pixels that would be wrongly identified as pixels of a textured zone. The singular pixels may then processed according to a method adapted to their nature.

According to one embodiment, the preliminary separation may comprise obtaining a reference kernel around the pixel being analyzed, and calculating the difference between each pixel in the reference kernel and the current pixel. The preliminary separation may comprise identifying the current pixel as a singular pixel if any one of the following conditions is met: the number of non-zero positive differences is close to the number of pixels in the kernel; the number of non-zero negative differences is close to the number of pixels in the kernel; the number of non-zero positive differences is close to the number of non-zero negative differences; and the luminance dynamics of the reference kernel are below a threshold.

According to one embodiment, the processing of each singular pixel may comprise calculating four sums of differences, a first one equal to the sum of the differences corresponding to the north and south pixels in the reference kernel, a second one equal to the sum of the differences corresponding to the east and west pixels, a third one equal to the sum of the differences corresponding to the north-west and south-east pixels, and the fourth one equal to the sum of the differences corresponding to the north-east and south-west pixels. The processing may also include finding the minimum sum, and calculating the current pixel as the mean of pixels located on the axis of the pixels corresponding to the minimum sum.

It may also be desirable to reduce the memory resources used when an original image, or a zone of the latter, undergoes a series of independent processes, with each producing a pixel calculated using a respective reference kernel. To that end, the reference kernels may all comprise pixels from the original image.

According to one embodiment, the processes may be performed in parallel and a resulting pixel is produced as a combination of the respective pixels produced by the processes. According to one embodiment, the method may comprise replacing a key pixel in the reference kernel used for a current process with the pixel produced by the previous process. According to another embodiment, the processes may be performed on a textured image zone and comprise an adaptive noise reduction, a sharpness increase, and an improvement of the acutance using the unsharp masks.

BRIEF DESCRIPTION OF THE DRAWINGS

Some embodiments will be explained in the following description, in relation with, but not limited to, the following figures, in which:

FIG. 1 is a schematic diagram of an image comprising two zones, according to the prior art.

FIG. 2 is a schematic diagram of a reference kernel for identifying a type of zone, according to the prior art.

FIG. 3 is a schematic diagram of an example of a differentiated processing stream for processing two zones of an image in a differentiated manner, according to the prior art.

DETAILED DESCRIPTION OF THE PREFERRED EMBODIMENTS

Figure 5:
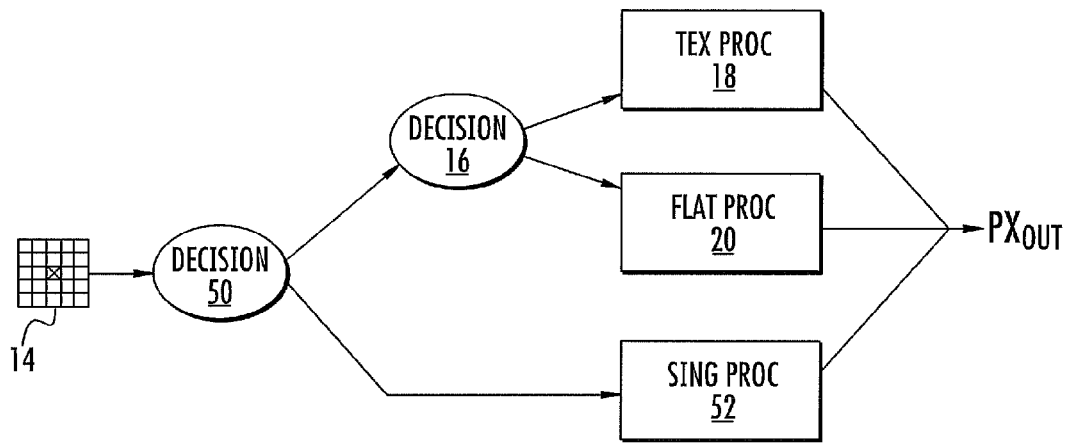
FIG. 5 is a schematic diagram of a processing stream for processing an image based on a pre-identification of singular pixels, according to the present invention.

FIG. 5 illustrates a differentiated processing stream for processing some zones of an image, wherein singular pixels are pre-selected and are extracted from the main stream to undergo a specific process. The object is to extract from the main stream the pixels likely to be classified by error in a category tending to produce visual artifacts, particularly the category corresponding to a textured zone. An opposite classification error, i.e. comprising classifying a pixel as belonging to a flat zone when it belongs to a textured zone, may not have any noteworthy visual consequences, and the object here is not to identify such pixels.

In practice, the pixels of the image are separated into three different categories, each one being subjected to an appropriate process. The main stream corresponds, for example, to the one in FIG. 3. Thus, in block 16, the category of the pixel is determined according to a simple typical criterion and, depending on the result, it is directed to a process adapted to textures, in block 18, or to flat zones, in block 20.

A decision or pre-selection step 50 is provided upstream from step 16. The reference kernels 14 of the original image are compared with a singularity criterion. If the pixel is classified as singular, it is extracted from the normal stream and directed to an appropriate process in block 52. Like the processes in blocks 18 and 20, the process in block 52 produces a single pixel $Px_{out}$ calculated from the reference kernel. It may be understood that, if the pixel is not classified as singular, it is directed to the normal stream, via the separation in block 16.

Generally speaking, the singularity criterion is developed to detect pixels that would be wrongly classified in step 16, particularly pixels belonging to a flat zone which would be classified as belonging to a texture. The following example of a singularity criterion has the advantage of being simple. Like for the criterion for separating flat/textured zones described in relation with FIG. 2, the difference $d_i$ between the pixel i and the central pixel is calculated for each pixel i in the reference kernel. These differences may then be used in step 16, as applicable.

A pixel is then considered singular if any one of the following conditions is met:
1. the number of non-zero positive differences is close to the number of pixels in the kernel;
2. the number of non-zero negative differences is close to the number of pixels in the kernel;
3. the number of non-zero positive differences is close to the number of non-zero negative differences; and
4. the luminance dynamics of the reference kernel is of low amplitude.

"Close" means a difference of a few units between the numbers, depending on the size of the kernel. For a 5×5 kernel, the numbers can be considered close if the difference is less than or equal to 2, i.e. on the order of 10% of the number of pixels in the kernel. The difference selected in each condition may be optimized by successive tests or statistical analyses.

The fourth component can be expressed by $d_{max}-d_{min}<L$, in which $d_{max}$ and $d_{min}$ are respectively the maximum difference and the minimum difference found in the reference kernel, and L is a luminance threshold, for example, on the order of 20% of the maximum dynamics. This component may enable contrasted regular pixels to be excluded from the image, such as light points on a dark surface or holes on a pale surface. Such pixels are appropriately processed in the normal stream, in which they may be classified as belonging to a texture.

The process performed in block 52 could be the process reserved for flat zones in block 20, generally a noise reduction by averaging calculated on the pixels in the kernel. A singular pixel could indeed be a pixel distorted by noise.

However, the abovementioned criterion, particularly its third or fourth component, also enables pixels located on a transition between zones of different brightness to be detected, which would also be detected in block 16 as belonging to a texture. Such a detection in block 16 is not necessarily wrong, since a transition between two texture elements can be considered to belong to the texture. However, better results have been obtained by processing such pixels using directional averaging.

Figure 6:
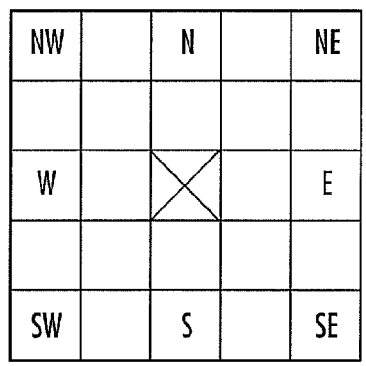
FIG. 6 is a schematic diagram of one use of a reference kernel for processing the singular pixels, according to the present invention.

FIG. 6 shows an example of using the pixels in the reference kernel to perform a simple directional averaging calculation. In the reference kernel, nine pixels are kept: the central pixel and the North N, South S, East E, West W, North-West NW, North-East NE, South-West SW and South-East SE pixels, i.e. a reduced reference kernel of 3×3 pixels is formed. The sum of the differences is calculated for each pair of opposite pixels in the reduced kernel, i.e. $d_{11}+d_{14}$ (or $d_W+d_E$), $d_1+d_{24}$ (or $d_{NW}+d_{SE}$), $d_3+d_{22}$ (or $d_N+d_S$), and $d_5+d_{20}$ (or $d_{NE}+d_{SW}$). The outgoing pixel $Px_{out}$ is then calculated as the mean of the pixels corresponding to the minimum sum of the differences. For example, if the minimum sum is $d_N+d_S$, the following is obtained:

$$Px_{out}=(Px_N+Px_S)/2.$$

According to one embodiment, the value of the central pixel $Px_c$ is used:

$$Px_{out}=(Px_N+Px_S+Px_c)/3.$$

According to another embodiment, the mean of two pixels, or of all the pixels, located on the axis of the two pixels corresponding to the minimum sum is calculated.

As mentioned above in relation with FIG. 4, when a process comprises the successive application of several independent algorithms, which is common for processing textured zones, each algorithm typically stores in a volatile memory an intermediate image portion, used by the following algorithm. It may be desirable to try to reduce the size of the volatile memory, particularly in embedded systems. This reduces the surface area of the circuits and power consumption.

Figure 7A:
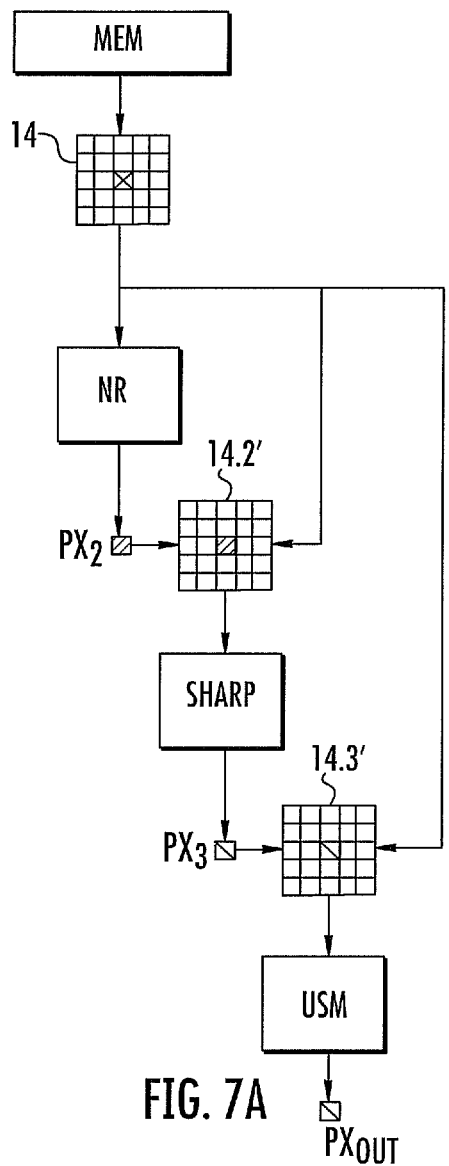
FIG. 7A is a schematic diagram of one embodiment of a processing stream for processing a textured zone, optimized to limit the memory resources, according to the present invention.

FIG. 7A illustrates one embodiment of a processing stream enabling the size of the volatile memory to be reduced. The principle underlying this stream is to use reference kernels for the successive algorithms whose pixels are taken from the original image, and to only handle in each step the pixel produced by the previous step.

For example, in FIG. 7A, for each pixel to be processed, a reference kernel 14 is read in the memory MEM containing the original image. This kernel is processed typically by the first algorithm NR, such as an adaptive noise reduction algorithm, which produces a first intermediate pixel $Px_2$. A reference kernel 14.2' is regenerated by taking the kernel 14 and replacing its key pixel, generally the central pixel, with the pixel $Px_2$. This kernel 14.2' supplies the next algorithm SHARP, for example, a sharpness improvement, which produces a new intermediate pixel $Px_3$. A new reference kernel 14.3' is regenerated, for the next algorithm USM, by taking the original kernel 14 and by replacing its key pixel with the pixel $Px_3$.

In this way, only the reference kernel 14 is stored in a fast memory, with this kernel being reused by each algorithm in the processing chain. The size of the reference kernel may depend on the algorithm used. Whatever its size, its pixels are all taken from the original image, which makes it easier to manage kernels of different sizes.

The processing time is furthermore significantly accelerated, as an algorithm in the chain no longer needs to wait for the previous algorithm to produce all the pixels of its reference kernel. This reference kernel is ready as soon as its key pixel is produced by the previous algorithm.

Figure 4:
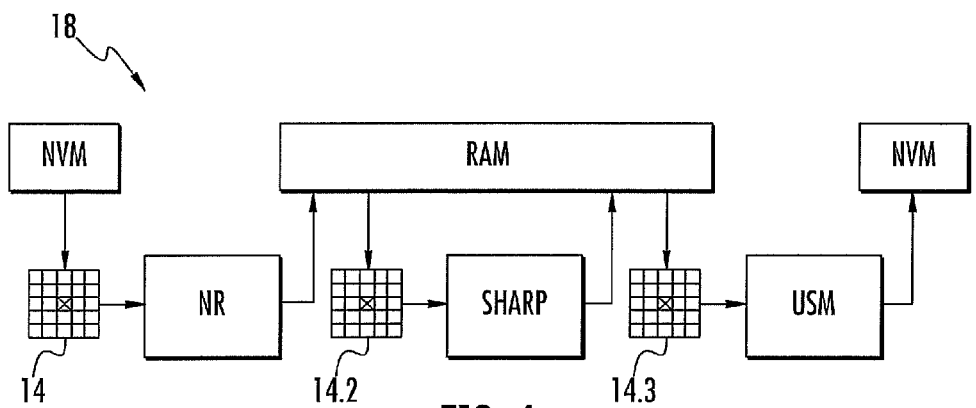
FIG. 4 is a schematic diagram of a processing stream for processing a textured zone of an image, according to the prior art.

It may be understood that, from the second algorithm in the chain onwards, the algorithms do not act on the same pixels as in the classic stream in FIG. 4. Therefore, a different resulting image is expected. It happens that the resulting image, even if it is indeed different in some cases, provides a satisfactory, or better, visual perception.

Figure 7B:
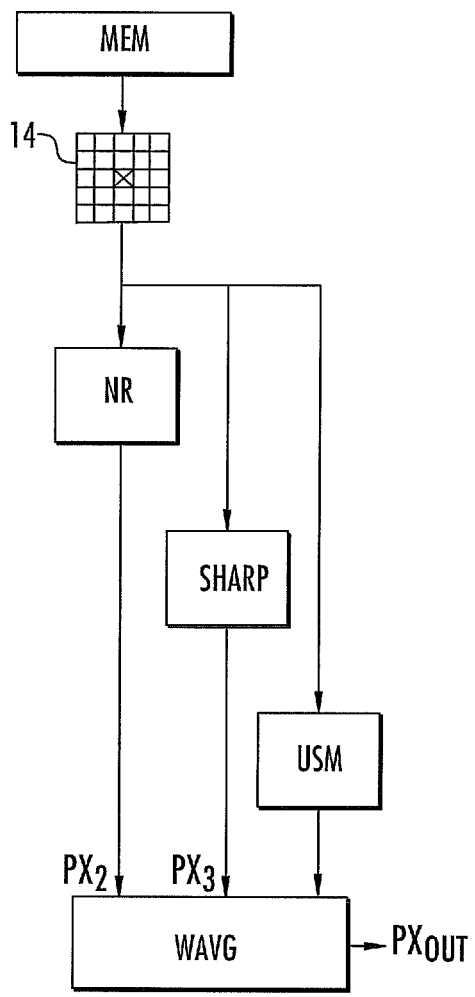
FIG. 7B is a schematic diagram of a second embodiment of an optimized processing stream, according to the present invention.

FIG. 7B illustrates a second embodiment of a processing stream enabling the size of the volatile memory to be reduced. Compared to FIG. 7A, instead of including the outgoing pixel of an algorithm in the center of the reference kernel for the next algorithm, each algorithm is used in parallel on a kernel fully formed of pixels from the original image, including the key pixel. The pixels produced independently by the algorithms are combined by a process or circuit WAVG to produce the outgoing pixel $Px_{out}$. This combination may be a weighted sum. As part of a usual process comprising a noise reduction (NR), an increase in sharpness (SHARP), and an improvement in the acutance (USM), respective values of 1, $\frac{1}{32}$ and $\frac{1}{64}$ are used as an example for the weighting coefficients. The end result is different from the one produced by the streams in FIGS. 4 and 7A, but the visual perception of the image is also satisfactory.

That which is claimed is:

1. A method for image processing comprising:

using a processor and associated memory for performing a separation of a plurality of pixels into first and second categories, the first category corresponding to pixels in a flat zone, and the second category corresponding to pixels in a textured zone;

using the processor and associated memory for processing the pixels of the first category based upon a method for the flat zone, and the pixels of the second category based upon a method for the textured zone;

using the processor and associated memory for, before the separation, performing a preliminary separation of the plurality of pixels into a normal pixel category of pixels for the separation, and a singular pixel category, the preliminary separation being based upon a criterion for selecting singular pixels as pixels that would be wrongly identified as pixels of the textured zone; and using the processor and associated memory for processing pixels in the singular pixel category.

2. The method according to claim 1 wherein the preliminary separation comprises:

obtaining a reference kernel around a current pixel being analyzed;

calculating a difference between each pixel in the reference kernel and the current pixel; and identifying the current pixel as a singular pixel.

3. The method according to claim 2 wherein identifying the current pixel as the singular pixel is based upon when at least one of the following conditions is true:
a number of non-zero positive differences is close to a number of pixels in the reference kernel;
a number of non-zero negative differences is close to the number of pixels in the reference kernel;
the number of non-zero positive differences is close to the number of non-zero negative differences; and
a luminance dynamic value of the reference kernel is below a threshold.

4. The method according to claim 2 wherein processing each singular pixel comprises:
calculating a plurality of sums of differences comprising a first sum equal to a sum of differences corresponding to north and south pixels in the reference kernel, a second sum equal to a sum of differences corresponding to east and west pixels, a third sum equal to a sum of differences corresponding to north-west and south-east pixels, and a fourth sum equal to a sum of the differences corresponding to north-east and south-west pixels;
finding a minimum sum; and
calculating the current pixel as a mean of pixels located on an axis of pixels corresponding to the minimum sum.

5. The method according to claim 1 further comprising processing the textured zone by at least:
subjecting each pixel of the textured zone to a series of independent processes, each independent process producing a pixel calculated using a respective reference kernel; and
taking pixels from the respective reference kernels in an original image.

6. The method according to claim 5 further comprising producing a final pixel as a combination of individual pixels produced by the series of independent processes.

7. The method according to claim 5 wherein the series of independent processes is performed in parallel and a resulting pixel is produced as a weighted sum of the respective pixels produced by the series of independent processes.

8. The method according to claim 5 wherein the series of independent processes is performed in the textured zone; and wherein the series of independent processes comprises an adaptive noise reduction process, a sharpness increase process, and an improvement of the acutance using an unsharp masks process.

9. A method for image processing comprising:
using a processor and associated memory for performing a separation of a plurality of pixels into first and second categories, the first category corresponding to pixels in a flat zone, and the second category corresponding to pixels in a textured zone;
using the processor and associated memory for processing the pixels of the first category based upon a method for the flat zone, and the pixels of the second category based upon a method for the textured zone;
using the processor and associated memory for, before the separation, performing a preliminary separation of the plurality of pixels into a normal pixel category of pixels for the separation, and a singular pixel category, the preliminary separation being based upon a criterion for selecting singular pixels as pixels that would be wrongly identified as pixels of the textured zone, the preliminary separation comprising
obtaining a reference kernel around a current pixel being analyzed,
calculating a difference between each pixel in the reference kernel and the current pixel, and
identifying the current pixel as a singular pixel;
processing pixels in the singular pixel category; and
processing the textured zone by at least
subjecting each pixel of the textured zone
to a series of independent processes, each independent process producing a pixel calculated using a respective reference kernel, and
taking pixels from the respective reference kernels in an original image.

10. The method according to claim 9 wherein identifying the current pixel as the singular pixel is based upon when at least one of the following conditions is true:
a number of non-zero positive differences is close to a number of pixels in the reference kernel;
a number of non-zero negative differences is close to the number of pixels in the reference kernel;
the number of non-zero positive differences is close to the number of non-zero negative differences; and
a luminance dynamic value of the reference kernel is below a threshold.

11. The method according to claim 9 wherein processing each singular pixel comprises:
calculating a plurality of sums of differences comprising a first sum equal to a sum of differences corresponding to north and south pixels in the reference kernel, a second sum equal to a sum of differences corresponding to east and west pixels, a third sum equal to a sum of differences corresponding to north-west and south-east pixels, and a fourth sum equal to a sum of the differences corresponding to north-east and south-west pixels;
finding a minimum sum; and
calculating the current pixel as a mean of pixels located on an axis of pixels corresponding to the minimum sum.

12. The method according to claim 11 further comprising producing a final pixel as a combination of individual pixels produced by the series of independent processes.

13. The method according to claim 11 wherein the series of independent processes is performed in parallel and a resulting pixel is produced as a weighted sum of the respective pixels produced by the series of independent processes.

14. The method according to claim 11 wherein the series of independent processes is performed in the textured zone; and wherein the series of independent processes comprises an adaptive noise reduction process, a sharpness increase process, and an improvement of the acutance using an unsharp masks process.

15. An electronic device comprising:
a processor and memory cooperating therewith and configured to
perform a separation of a plurality of pixels into first and second categories, the first category corresponding to pixels in a flat zone, and the second category corresponding to pixels in a textured zone,
process the pixels of the first category based upon a method for the flat zone, and the pixels of the second category based upon a method for the textured zone,
before the separation, perform a preliminary separation of the plurality of pixels into a normal pixel category of pixels for the separation, and a singular pixel category, the preliminary separation being based upon a criterion for selecting singular pixels as pixels that would be wrongly identified as pixels of the textured zone, and
process pixels in the singular pixel category.

16. The electronic device according to claim 15 wherein the preliminary separation comprises:

obtaining a reference kernel around a current pixel being analyzed;

calculating a difference between each pixel in the reference kernel and the current pixel; and identifying the current pixel as a singular pixel.

17. The electronic device according to claim 16 wherein identifying the current pixel as the singular pixel is based upon when at least one of the following conditions is true:

a number of non-zero positive differences is close to a number of pixels in the reference kernel;

a number of non-zero negative differences is close to the number of pixels in the reference kernel;

the number of non-zero positive differences is close to the number of non-zero negative differences; and a luminance dynamic value of the reference kernel is below a threshold.

18. The electronic device according to claim 16 wherein said processor and memory are configured to process each singular pixel by at least:

calculating a plurality of sums of differences comprising a first sum equal to a sum of differences corresponding to north and south pixels in the reference kernel, a second sum equal to a sum of differences corresponding to east and west pixels, a third sum equal to a sum of differences corresponding to north-west and south-east pixels, and a fourth sum equal to a sum of the differences corresponding to north-east and south-west pixels;

finding a minimum sum; and calculating the current pixel as a mean of pixels located on an axis of pixels corresponding to the minimum sum.

19. The electronic device according to claim 15 wherein said processor and memory are configured to process the textured zone by at least:

subjecting each pixel of the textured zone to a series of independent processes, each independent process producing a pixel calculated using a respective reference kernel; and taking pixels from the respective reference kernels in an original image.

20. The electronic device according to claim 19 wherein said processor and memory are configured to produce a final pixel as a combination of individual pixels produced by the series of independent processes.

21. The electronic device according to claim 19 wherein the series of independent processes is performed in parallel and a resulting pixel is produced as a weighted sum of the respective pixels produced by the series of independent processes.

22. The electronic device according to claim 19 wherein the series of independent processes is performed in the textured zone; and wherein the series of independent processes comprises an adaptive noise reduction process, a sharpness increase process, and an improvement of the acutance using an unsharp masks process.

* * * * *